(12) United States Patent
Lee et al.

(10) Patent No.: US 12,355,285 B2
(45) Date of Patent: Jul. 8, 2025

(54) STABILIZATION SYSTEM OF ESS AND METHOD THEREFOR

(71) Applicant: LG CHEM, LTD., Seoul (KR)

(72) Inventors: Ji Won Lee, Daejeon (KR); Jong Soo Lee, Daejeon (KR); Sung Han Yoon, Daejeon (KR); Jun Min Lee, Daejeon (KR); Hyun Min Lee, Daejeon (KR); Hang Jin Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 859 days.

(21) Appl. No.: 17/294,809

(22) PCT Filed: Jan. 31, 2020

(86) PCT No.: PCT/KR2020/001541
§ 371 (c)(1),
(2) Date: May 18, 2021

(87) PCT Pub. No.: WO2020/171417
PCT Pub. Date: Aug. 27, 2020

(65) Prior Publication Data
US 2022/0006306 A1    Jan. 6, 2022

(30) Foreign Application Priority Data

Feb. 21, 2019  (KR) ........................ 10-2019-0020729

(51) Int. Cl.
*H02J 7/00*        (2006.01)
*H01M 10/48*       (2006.01)
(Continued)

(52) U.S. Cl.
CPC ........... *H02J 7/0032* (2013.01); *H01M 10/48* (2013.01); *H01M 10/486* (2013.01);
(Continued)

(58) Field of Classification Search
CPC .. H02J 7/0032; H02J 7/00309; H01M 50/296; H01M 50/581; H01M 50/204; H01M 50/14; H01M 10/48; H01M 10/486
See application file for complete search history.

(56) References Cited

U.S. PATENT DOCUMENTS

2010/0127662 A1  5/2010  Ha et al.
2013/0187616 A1  7/2013  Chuang et al.
(Continued)

FOREIGN PATENT DOCUMENTS

CN    101682091 A    3/2025
JP    2002-141112 A  5/2002
(Continued)

OTHER PUBLICATIONS

International Search Report for PCT/KR2020/001541 mailed on May 27, 2020.
(Continued)

*Primary Examiner* — Miriam Stagg
*Assistant Examiner* — Emily Elizabeth Freeman
(74) *Attorney, Agent, or Firm* — Birch, Stewart, Kolasch & Birch, LLP

(57) ABSTRACT

A fire spreading prevention method in an energy storage system (ESS) composed of a plurality of battery racks including an individual battery rack fire detection step of detecting whether a fire occurs for each of the plurality of battery racks and a battery rack forced discharge step of forcibly discharging at least some of the plurality of battery racks when a fire is detected in the individual battery rack fire detection step.

14 Claims, 4 Drawing Sheets

(51) Int. Cl.
*H01M 50/14* (2021.01)
*H01M 50/204* (2021.01)
*H01M 50/296* (2021.01)
*H01M 50/581* (2021.01)

(52) U.S. Cl.
CPC ......... *H01M 50/14* (2021.01); *H01M 50/204* (2021.01); *H01M 50/296* (2021.01); *H01M 50/581* (2021.01); *H02J 7/00309* (2020.01)

(56) References Cited

U.S. PATENT DOCUMENTS

| | | |
|---|---|---|
| 2015/0051771 A1 | 2/2015 | Greenwood et al. |
| 2015/0084597 A1 | 3/2015 | Kim et al. |
| 2016/0141712 A1* | 5/2016 | Choi ............... H01M 50/227 320/112 |
| 2017/0113080 A1* | 4/2017 | Specht ............. A62D 1/0014 |
| 2017/0144562 A1* | 5/2017 | Thomas ........... H01M 10/4257 |
| 2017/0207651 A1* | 7/2017 | Geng ................ H01M 10/44 |
| 2018/0375371 A1* | 12/2018 | Duhaut ............ B60L 58/10 |
| 2019/0299799 A1* | 10/2019 | Hinterberger ..... B60L 50/64 |
| 2021/0083339 A1* | 3/2021 | Hinterberger ..... H01M 10/425 |

FOREIGN PATENT DOCUMENTS

| | | |
|---|---|---|
| JP | 2011-120423 A | 6/2011 |
| JP | 2014-68510 A | 4/2014 |
| JP | 2014-75906 A | 4/2014 |
| JP | 2015-89170 A | 5/2015 |
| JP | 2016-2419 A | 1/2016 |
| JP | 2017-195717 A | 10/2017 |
| JP | 2018-182915 A | 11/2018 |
| KR | 10-0906249 B1 | 7/2009 |
| KR | 10-2015-0025433 A | 3/2015 |
| KR | 10-2015-0081987 A | 7/2015 |
| KR | 10-1584295 B1 | 1/2016 |
| KR | 10-2016-0094216 A | 8/2016 |
| KR | 10-1706717 B1 | 3/2017 |
| KR | 10-1812119 B1 | 12/2017 |
| KR | 10-1822928 B1 | 1/2018 |
| KR | 10-1836118 B1 | 3/2018 |
| KR | 10-1869954 B1 | 6/2018 |
| KR | 10-1918022 B1 | 11/2018 |
| WO | WO 2017/029715 A1 | 2/2017 |
| WO | WO 2018/099731 A1 | 8/2018 |

OTHER PUBLICATIONS

European Search Report for European Patent Application No. 20759241.1 dated Sep. 29, 2021.

* cited by examiner

STABILIZATION SYSTEM OF ESS AND METHOD THEREFOR

TECHNICAL FIELD

The present invention relates to a system and method for preventing the spread of fire when the fire or vibration occurs in the ESS and removing the unstable elements caused by the vibration.

BACKGROUND ART

In general, an Energy Storage System (ESS) refers to a storage device that stores over-produced power in a power plant and transmits it when power is temporarily lacked. In recent years, large-scale ESS devices have been made small and increasingly used in buildings, factories, homes, and the like for power outage preparation or peak power reduction.

Recently, as interest in renewable energy has increased rapidly due to the power supply and demand imbalance, the development of technology that uses renewable energy to store the electricity produced by using renewable energy and make it available at the required time is continuously being made.

In particular, as it is mandatory to install an ESS for newly constructed public buildings and ESS installations increase in energy savings in private buildings, and the like, the ESS market continues to grow.

When installing an ESS in a building, and the like, batteries that store energy, BMSs that manage batteries, and PCS that convert power are accommodated in the battery rack of the ESS as in the following patent documents, and such a battery rack is accommodated in a predetermined space such as a basement for operation.

At this time, in the summer when an external temperature is high, the temperature of the ESS system is excessively increased due to a lot of heat generated from the battery of the ESS, and this increases the risk of fire. If damaged by an earthquake, despite the high risk of secondary accidents such as fire and power cuts, the technology development for this has not been active.

(Prior art document) Korean Patent Publication No. 10-2016-0094216

DISCLOSURE OF THE INVENTION

Technical Problem

The present invention provides an ESS stabilization system and method for preventing the spread of fire and removing the risk of shock or vibration when a fire occurs in the ESS, or when more shock or vibration than necessary occurs due to an earthquake or the like.

Technical Solution

A fire spreading prevention and stabilization method of an energy storage system (ESS) composed of a plurality of battery racks according to an embodiment of the present invention includes: an individual battery rack fire detection step of detecting whether a fire occurs for each of the plurality of battery racks; and a battery rack forced discharge step of forcibly discharging at least some of the plurality of battery racks in response to a fire being detected in the individual battery rack fire detection step.

The battery rack forced discharge step may be configured to include a discharge battery rack setting step of setting a battery rack among the plurality of battery racks to be forcibly discharged, and a discharge order setting step of setting a discharge order of the battery rack to be forcibly discharged.

The discharge battery rack setting step may perform a fire occurrence battery rack ID check step of checking an ID of a first battery rack among the plurality of battery racks where a fire occurs and an adjacent battery rack ID check step of checking the ID of a second battery rack adjacent to the first battery rack where the fire occurs to set at least one of the plurality of battery racks adjacent the first battery rack where a fire occurs as a discharge battery rack or to set all battery racks constituting the ESS as a discharge battery rack.

The discharge order setting step may include setting the order to discharge according to an ID or a state of charge (SOC) of the discharge battery rack, or simultaneously setting and discharging the discharge battery rack.

In addition, the present invention may further include an ESS vibration detection step of detecting whether the ESS is exposed to a predetermined level of vibration, and in response to the predetermined level of vibration being detected in the ESS, the battery rack forced discharge step may include forcibly discharging all the battery rack of the ESS.

An ESS composed of a plurality of battery racks according to an embodiment of the present invention includes a forced discharge device configured to forcibly discharge power of the ESS, a main output line configured to form a current path between the plurality of battery racks and an electronic device, a forced discharge line configured to form a current path between the plurality of battery racks and the forced discharge device, and an ESS controller configured to set the connection of each of the plurality of battery racks to one of the main output line and the forced discharge line, wherein each of the plurality of battery racks includes: a fire detector configured to detect a fire of the battery rack and to output a fire detection signal upon detecting the fire of the battery rack, and a switch assembly configured to connect the battery rack to the main output line or the forced discharge line under the control of the ESS controller.

The ESS controller may include a forced discharge battery rack setting module configured to set at least one battery rack to be forcibly discharged among the plurality of battery racks, when receiving a fire detection signal from at least one of the fire detectors, and a discharge order setting module configured to set a discharge order of the at least one battery rack to be forcibly discharged.

The forced discharge battery rack setting module may be configured to detect an ID of a battery rack where a fire is detected by the respective fire detector, and detect an ID of at least one battery rack adjacent to the battery rack where the fire is detected, set the at least one battery rack adjacent the battery rack where the fire is detected as a discharge battery rack, or set all battery racks constituting the ESS as the discharge battery rack.

The discharge order setting module may be configured to set an order for sequentially discharging the discharge battery rack.

Each switch assembly includes a main output control switch having a first end connected to the main output line and a second end connected to an output terminal of the respective battery rack, and a forced discharge control switch having a first end connected to the forced discharge line and a second end connected to an output terminal of the respective battery rack, in response to a battery rack being set a forced discharge battery rack, the controller is configured to turn off the respective main output control switch and to turn on the respective forced discharge control switch.

The forced discharge device may be configured to consume a predetermined power capacity within a predetermined time.

The fire detector may detect a temperature of the respective battery rack and the presence of smoke.

In addition, the present invention may further include a vibration detector configured to detect vibration of the ESS, wherein when a predetermined vibration is detected by the vibration detector, the forced discharge battery rack setting module may be configured to set all the battery racks constituting the ESS as a discharge battery rack.

Advantageous Effects

The present invention can prevent the fire from spreading when a fire occurs in the ESS.

In addition, when a fire occurs in the at least one battery rack of an ESS, the present invention prevents the fire from spreading to the adjacent battery rack to stably use the ESS by forcibly discharging the battery rack and the adjacent battery rack.

In addition, when a fire occurs in the outside of an ESS, the present invention prevents the battery rack from exploding and spreading the fire by forcibly discharging all the battery racks.

In addition, when shock or vibration occurs due to an earthquake and the like outside an ESS, the present invention can prevent the spread of fire and eliminate the risk of shock or vibration.

MODE FOR CARRYING OUT THE INVENTION

Figure 1:
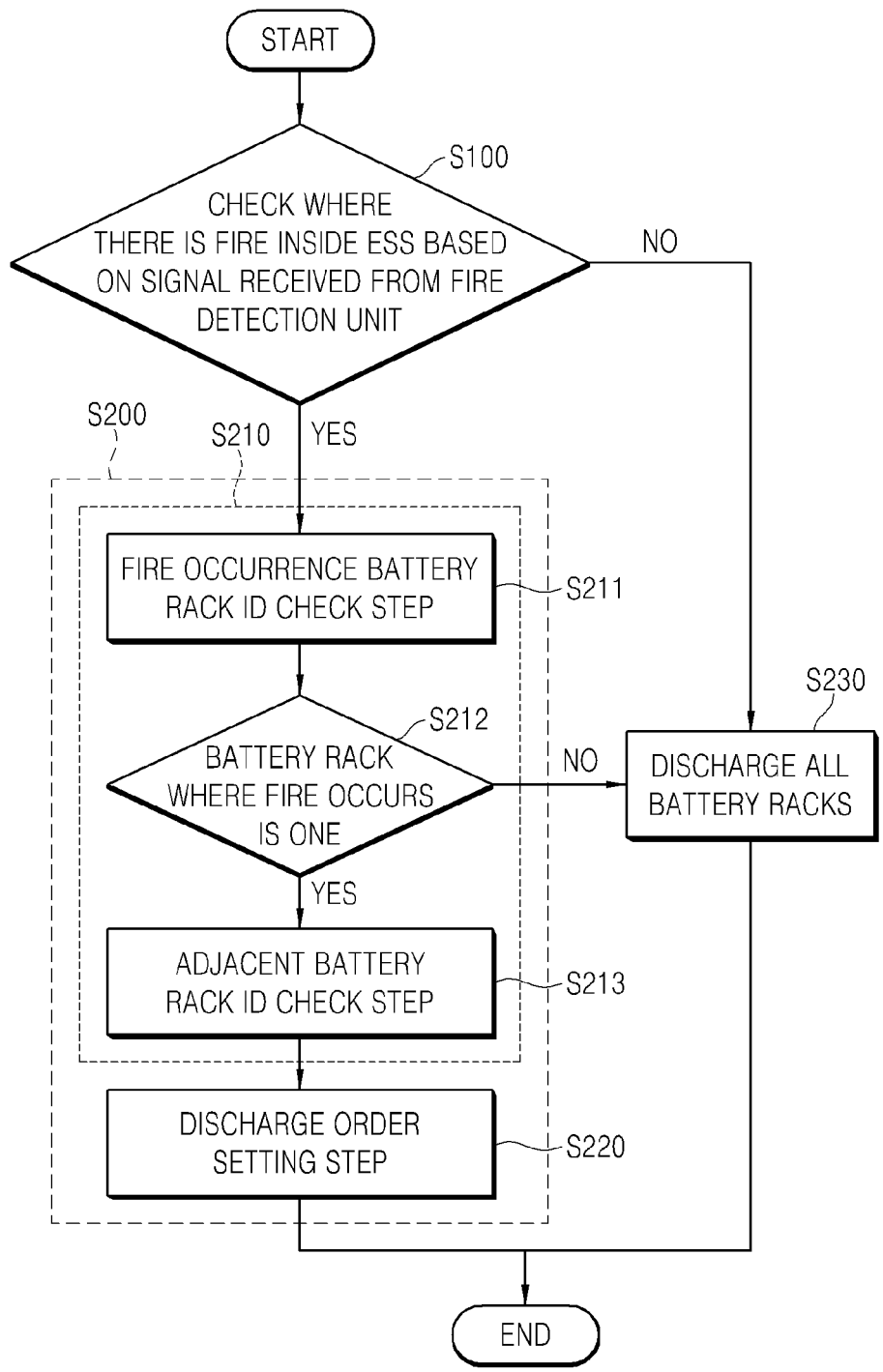
FIG. 1 is a flowchart illustrating a sequence of an ESS fire spreading prevention method according to a first embodiment of the present invention.

Hereinafter, embodiments of the present invention will be described in detail with reference to the accompanying drawings so that those skilled in the art may easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "initial," "second," etc., may be used herein to describe various elements, these elements should not be limited by these terms. The above terms are used only to distinguish one component from another. For example, an initial component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

1. Fire Spreading Prevention Method of an ESS According to the First Embodiment of the Present Invention.

The present invention is an invention for preventing the spread of fire of the ESS. Specifically, it is intended to detect a battery rack where a fire occurs and prevent the spread of the fire by forcibly discharging the battery rack adjacent to the battery rack where the fire occurs.

On the other hand, when the state of charge (SOC) of the battery rack is below a predetermined value, the risk of fire spreading is significantly reduced.

In other words, if the SOC of the battery rack is less than 60%, since the battery rack without fire does not explode and the fire does not spread when fire occurs in an adjacent battery rack, it is possible to prevent the spread of fire while maintaining the SOC of the battery rack below a predetermined value.

Meanwhile, if the SOC of the battery rack is further lowered below the predetermined value, although there is an advantage in reducing the risk of fire spreading to the battery rack, since charging the battery rack is expensive and time-consuming in the normal state after the fire is extinguished, it is efficient to discharge the battery rack only to an appropriate SOC. For this reason, in the present invention, 60% SOC is selected as the optimal discharge SOC.

Meanwhile, when fire occurs in any one of the battery racks, the appropriate SOC may be a maximum SOC that adjacent battery racks are not exploded by the temperature of the battery rack where fire occurs.

For example, the appropriate SOC may be 60%. When the SOC of the battery rack is below 60%, even if fire occurs in an adjacent battery rack, no fire spreads to battery racks where the SOC is below 60%, and after the fire is extinguished, the time and cost for full charging may be less than the time and cost for fully charging a battery rack where the SOC is 30%.

Therefore, in the present invention, when forcibly discharging the SOC of the battery rack to a predetermined value, the principle of reducing the spread of fire is used to prevent the spread of fire of the ESS.

FIG. 1 is a flowchart illustrating a fire spreading prevention method of an ESS according to a first embodiment of the present invention.

Hereinafter, a fire spreading prevention method of an ESS according to a first embodiment of the present invention will be described with reference to FIG. 1.

The fire spreading prevention method according to the first embodiment of the present invention may be performed in an ESS including a plurality of battery racks. Specifically, the method may include an individual battery rack fire detection step (S100) of detecting a fire for each of the plurality of battery racks, and a battery rack forced discharge step (S200) of forcibly discharging at least some of the plurality of battery racks when a fire is detected in the individual battery rack fire detection step.

Meanwhile, the individual battery rack fire detection step (S100) detects the fire of the battery rack using a conventional fire detector, and if a fire is detected, the fire detector may transmit a fire detection signal to the control unit of the ESS.

Meanwhile, the battery rack forced discharge step S200 may be configured to include a discharge battery rack setting step S210 for setting a battery rack to be forcibly discharged and a discharge order setting step S220 for setting a discharge order of the battery rack to be forcibly discharged.

Meanwhile, the discharge battery rack setting step (S210) may be configured to include a fire occurrence battery rack ID check step (S211) and an adjacent battery rack ID check step (S212) of checking the ID of the battery rack and the adjacent battery rack where the fire occurs (S213). Meanwhile, the adjacent battery rack ID check step may be performed in a control unit of the ESS, and the control unit of the ESS may store ID and location information on a plurality of battery racks constituting the ESS.

The discharge battery rack setting step S210 may set at least one battery rack adjacent to a battery rack where fire occurs as a discharge battery rack or set all battery racks constituting the ESS as a discharge battery rack.

For example, in a case where the number of battery racks where fire occurs is 1 by further performing fire occurring battery rack number check step (S212) to check whether the number of battery racks where fire occurs is 1, if the number of battery racks where fire occurs is 1, only the battery rack adjacent to the fire is forcibly discharged, and if there are two or more battery racks where fire occurs, all battery racks can be set as a forced discharge battery rack (S230) and can be forcibly discharged.

Specifically, when it is determined that the fire occurs only in the third battery rack in the ESS consisting of ten battery racks (first to tenth battery racks), the ESS control unit detects that the battery rack adjacent to the third battery rack is the second battery rack and the fourth battery rack, and sets the second battery rack and the fourth battery rack as forced discharge battery racks.

Meanwhile, as another example, if it is determined that a fire occurs in the third battery rack, the sixth battery rack, and the sixth battery rack in the ESS including ten battery racks (first to tenth battery racks), all battery racks constituting the ESS may be set as a forced discharge battery rack and all battery racks may be discharged (S230).

As another example, if a fire detection signal is transmitted from the external fire detector to the ESS, all battery racks constituting the ESS may be set as a forced discharge battery rack and forcibly discharged (S230).

That is, according to the number of racks where fire occurs among the battery racks constituting the ESS or a fire detection signal from the outside of the ESS, the battery rack to be forcibly discharged may be set.

Meanwhile, the discharge order setting step sets the order to be discharged according to the ID or SOC of the battery rack set as the discharge battery rack or sets the battery rack set as the discharge battery rack to be discharged simultaneously.

For example, the order of discharging the battery rack may sequentially perform discharging in the order in which the IDs of the battery racks are ascending or in the order of the high SOC.

Specifically, when it is determined that a fire occurs only in the third battery rack in the ESS consisting of ten battery racks (first to tenth battery racks), after discharging the second battery rack with the quickest ID among the second battery rack and the fourth battery rack adjacent to the third battery rack, the fourth battery rack may be set as force discharge.

As another example, when it is determined that a fire occurs only in the third battery rack in the ESS consisting of ten battery racks (first to tenth battery racks), after the fourth battery rack having the larger SOC first among the second battery rack having 80% SOC adjacent to the third battery rack and the fourth battery rack having 90% SOC, the second battery rack may be set to be forcibly discharged.

Meanwhile, as another example, if it is determined that a fire occurs in the third battery rack, the sixth battery rack, and the sixth battery rack in the ESS including ten battery racks (first to tenth battery racks), it is possible to set to discharge all battery racks constituting the ESS at the same time.

As another example, if a fire detection signal is transmitted from the external fire detector to the ESS, it may be set to forcibly discharge all battery racks constituting the ESS at the same time.

That is, according to the number of racks where fire occurs among the battery racks constituting the ESS or a fire detection signal from the outside of the ESS, the order to force discharge may be set.

Figure 3:
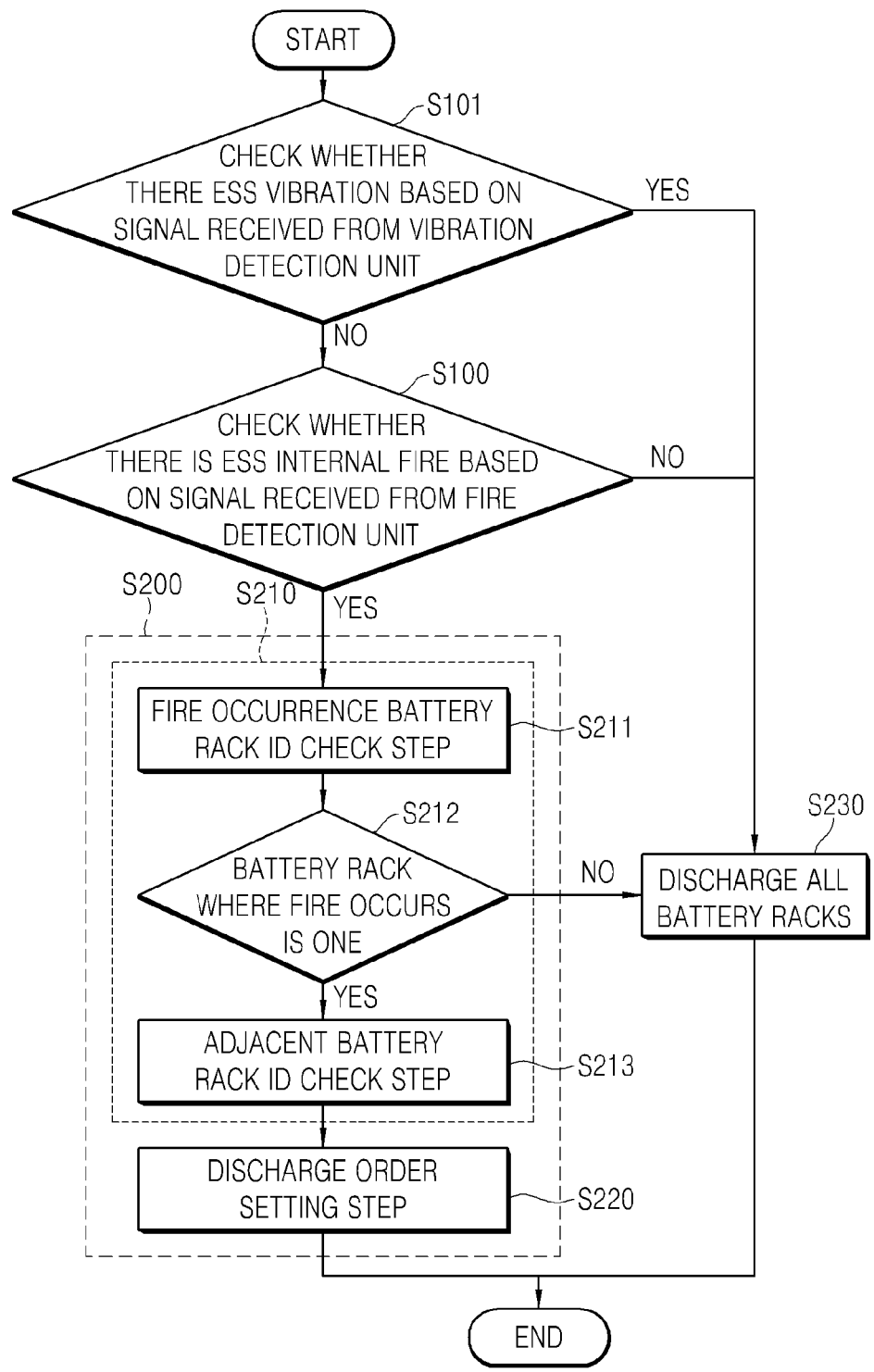
FIG. 3 is a flowchart illustrating a sequence of an ESS fire spreading prevention method according to a second embodiment of the present invention.

Meanwhile, FIG. 3 is a flowchart illustrating a sequence of an ESS fire spreading prevention method according to a second embodiment of the present invention. The fire spreading prevention method of the ESS according to the second embodiment of the present invention may further include a vibration detection step (S101) of detecting the vibration of the ESS as shown in FIG. 3.

As a result of performing the vibration detection step of detecting the vibration of the ESS, if a certain vibration is detected, all battery racks may be forcedly discharged by performing the above-described battery rack forced discharge step.

Meanwhile, if vibration is not detected in the vibration detection step, the battery rack forced discharge step S200 according to the first embodiment of the present invention described above may be performed.

2. ESS According to a First Embodiment of the Present Invention

Figure 2:
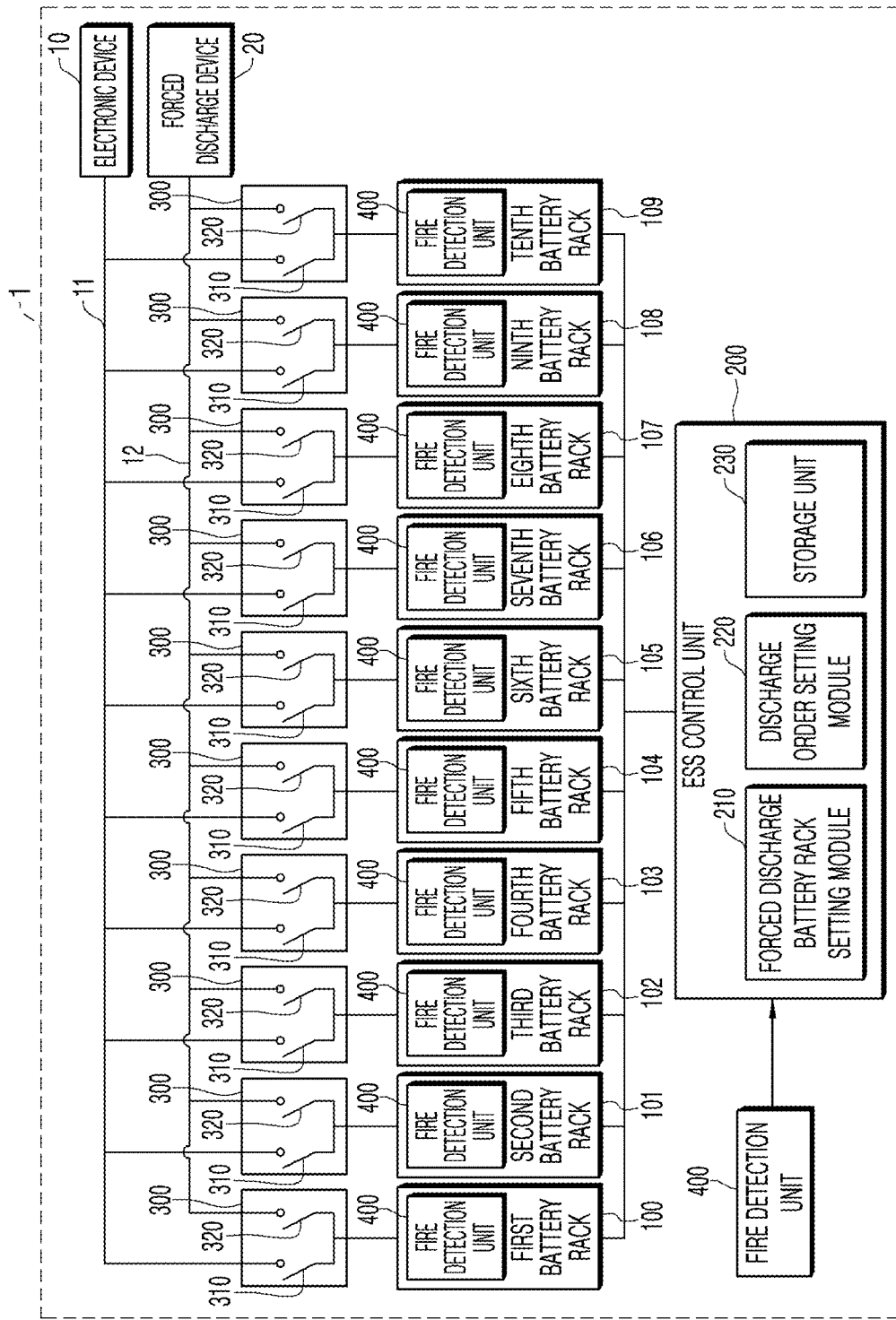
FIG. 2 is a diagram illustrating an ESS according to the first embodiment of the present invention.

FIG. 2 is a diagram illustrating an ESS according to the first embodiment of the present invention.

Hereinafter, an ESS according to an embodiment of the present invention will be described with reference to FIG. 2.

An ESS 1 according to an embodiment of the present invention may be configured to include the forced discharge device 20 consisting of a plurality of battery racks 100 to 109 and for forcibly discharging the power of the ESS, a main output line 11 for forming a current path between the plurality of battery racks 100 to 109 and the electronic device 10, a forced discharge line 12 for forming a current path between the plurality of battery racks and the forced discharge device 20, and an ESS control unit 200 for setting which line among the main output line 11 and the forced discharge line 12 each of the plurality of battery racks is connected to.

Meanwhile, each of the plurality of battery racks may be configured to include a fire detection unit 400 for detecting the fire of the battery rack and a switching unit 300 for connecting the battery rack to the main output line or the forced discharge line under the control of the ESS control unit 200.

Meanwhile, the fire detection unit 400 may be provided in each of the battery rack and a part of the ESS, and a fire detection unit provided in each of the battery racks may detect whether or not a fire occurs in the battery rack, and a fire detection unit provided in a part of the ESS may detect whether a fire is outside of the ESS.

Meanwhile, the ESS control unit 200 may be configured to include a forced discharge battery rack setting module 210 for setting a battery rack to be forcibly discharged among the plurality of battery racks when receiving a fire detection signal from the fire detection unit 400, and a discharge order setting module 220 for setting the discharge order of the battery rack to be forcibly discharged.

Meanwhile, the ESS control unit 200 may further include a storage unit 230 in which IDs and location information of a plurality of battery racks constituting the ESS are stored.

For example, the forced discharge battery rack setting module may check the ID of the battery rack where the fire occurs, detect an ID of a battery rack adjacent to the battery rack where the fire occurs in the storage unit, and set at least one battery rack adjacent to the fired battery rack as a discharge battery rack.

Alternatively, all battery racks constituting the ESS may be set as discharge battery racks without detecting adjacent battery racks.

For example, when it is determined that a fire occurs only in a third battery rack in an ESS consisting of ten battery racks (first to tenth battery racks), the forced discharge battery rack setting module may detect that the second battery rack and the fourth battery rack are adjacent to the third battery rack where the fire occurs by using the storage unit, and set the second battery rack and the fourth battery rack adjacent to the third battery rack as the forced discharge battery racks.

Meanwhile, as another example, if it is determined that a fire occurs in the third battery rack, the sixth battery rack, and the sixth battery rack in the ESS including ten battery racks (first to tenth battery racks), All battery racks constituting the ESS can be set as forced discharge battery racks.

As another example, when a fire detection signal is transmitted from the external fire detector to the ESS, all battery racks constituting the ESS may be set as a forced discharge battery rack.

That is, according to the number of racks where fire occurs among the battery racks constituting the ESS or a fire detection signal from the outside of the ESS, the battery rack to be forcibly discharged may be set.

Meanwhile, the discharge order setting module sets the order to be discharged according to the ID or SOC of the battery rack set as the discharge battery rack or sets the battery rack set as the discharge battery rack to be discharged simultaneously.

For example, the order of discharging the battery rack may sequentially perform discharging in the order in which the IDs of the battery racks are ascending or in the order of the high SOC.

Specifically, when it is determined that a fire occurred only in the third battery rack in the ESS consisting of ten battery racks (first to tenth battery racks), after discharging the second battery rack with the quickest ID among the second battery rack and the fourth battery rack adjacent to the third battery rack, the fourth battery rack may be set to be forcibly discharged.

As another example, when it is determined that a fire occurs only in the third battery rack in the ESS consisting of ten battery racks (first to tenth battery racks), after the fourth battery rack having the larger SOC first among the second battery rack having 80% SOC adjacent to the third battery rack and the fourth battery rack having 90% SOC, the second battery rack may be set to be forcibly discharged.

Meanwhile, as another example, if it is determined that a fire occurs in the third battery rack, the sixth battery rack, and the sixth battery rack in the ESS including ten battery racks (first to tenth battery racks), it is possible to set to discharge all battery racks constituting the ESS at the same time.

As another example, if a fire detection signal is transmitted from the external fire detector to the ESS, it may be set to forcibly discharge all battery racks constituting the ESS at the same time.

That is, according to the number of racks where fire occurs among the battery racks constituting the ESS or a fire detection signal from the outside of the ESS, the order to force discharge may be set.

Meanwhile, the switching unit 300 may be configured to include a main output control switch 310 where one end is connected to the main output line 11 and the other end is connected to the output terminal of the battery rack, and a forced discharge control switch 320 where one end is connected to the forced discharge line 12 and the other end is connected to the output terminal of the battery rack.

On the other hand, when the battery rack that the switching unit 300 belongs is set as a forced discharge battery rack, the main output control switch 310 may be turned off, and the forced discharge control switch 320 may be turned on.

Meanwhile, the forced discharge device 20 may be a device set to consume a predetermined power capacity within a predetermined time.

For example, the forced discharge device may be a device for converting electrical energy stored in the ESS into thermal energy.

Meanwhile, the fire detection unit 400 may detect the temperature of the battery rack, the presence of smoke, and the like to detect the fire of the battery rack.

Figure 4:
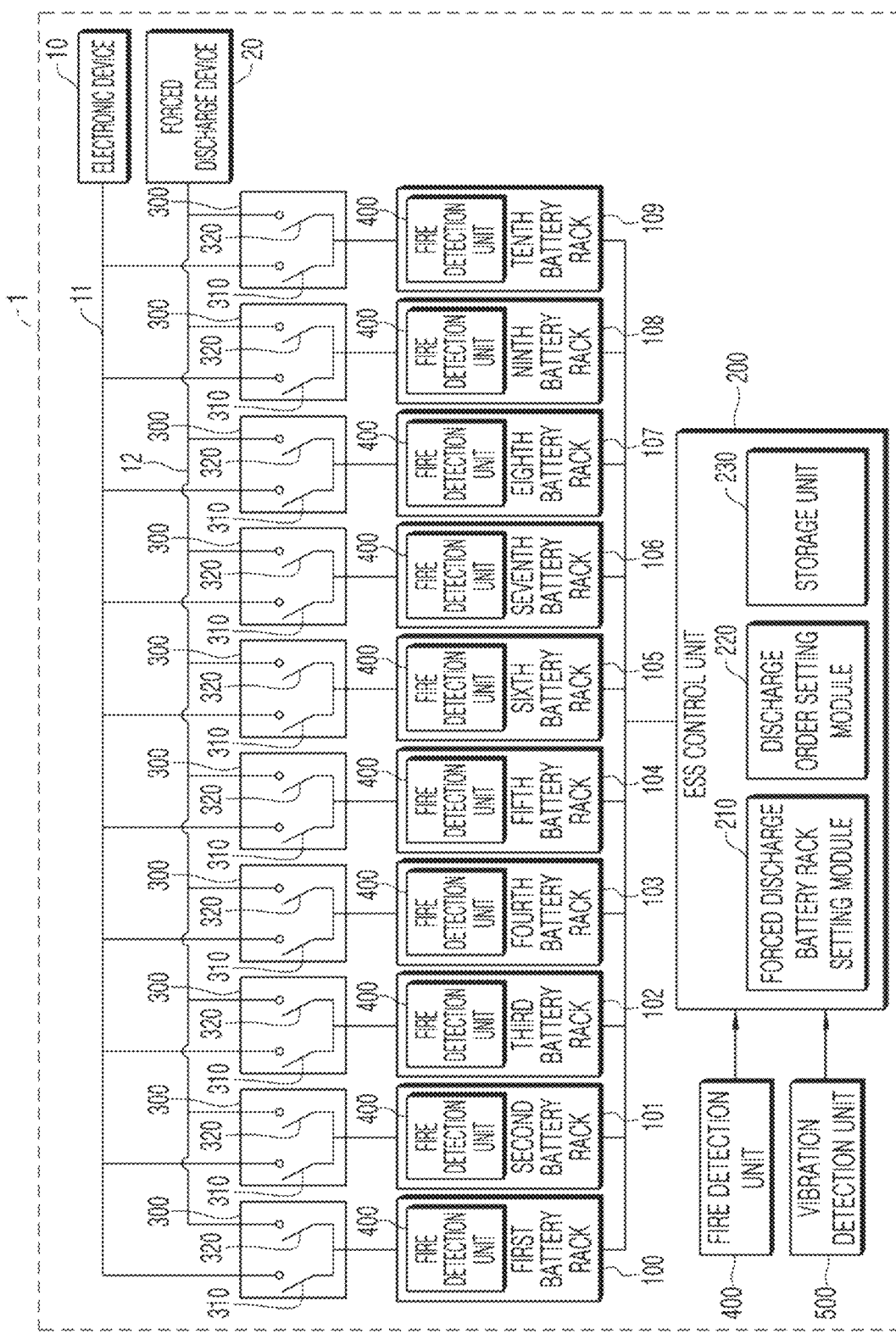
FIG. 4 is a diagram illustrating an ESS according to a second embodiment of the present invention.

Meanwhile, FIG. 4 is a diagram illustrating an ESS according to a second embodiment of the present invention.

The ESS according to the second embodiment of the present invention may further include a vibration detection unit 500.

In detail, the vibration detection unit 500 may detect whether there is an earthquake or a shock of an ESS and may force discharge all battery racks when a predetermined shock or vibration is detected.

Meanwhile, if vibration is not detected, a rack adjacent to the battery rack where a fire is detected by detecting fire occurrence or the entire battery rack constituting the ESS may be forcibly discharged by the method of the first embodiment described above.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations may be made in the present invention without departing from the spirit and scope of the invention.

The invention claimed is:

1. An energy storage system (ESS) composed of a plurality of battery racks, the ESS comprising:
    a forced discharge device configured to forcibly discharge power of the ESS;
    a main output line configured to form a current path between the plurality of battery racks and an electronic device;
    a forced discharge line configured to form a current path between the plurality of battery racks and the forced discharge device; and
    an ESS controller configured to set a connection of the plurality of battery racks to one of the main output line and the forced discharge line,
    wherein each of the plurality of battery racks comprises:
        a fire detector configured to detect a fire of the battery rack and to output a fire detection signal upon detecting the fire of the battery rack; and
        a switch assembly configured to connect the battery rack to the main output line or the forced discharge line under the control of the ESS controller, and
    wherein each switch assembly is directly connected to the forced discharge line, and
    wherein the forced discharge device is configured to discharge at least one battery rack of the plurality of battery racks to a predetermined state of charge (SOC), the predetermined SOC being greater than a 30% SOC.

2. The ESS of claim 1, wherein the ESS controller comprises:
    a forced discharge battery rack setting module configured to set at least one battery rack of the plurality of battery racks to be forcibly discharged, when receiving the fire detection signal from at least one of the fire detectors; and
    a discharge order setting module configured to set a discharge order of the at least one battery rack to be forcibly discharged.

3. The ESS of claim 2, wherein the forced discharge battery rack setting module is configured to:
    detect an identification (ID) of a battery rack where the fire is detected by the respective fire detector, and
    detect an identification (ID) of at least one battery rack adjacent to the battery rack where the fire is detected, and
    wherein the forced discharge battery rack setting module is further configured to perform at least one of:
    setting the at least one battery rack adjacent to the battery rack where the fire is detected as a discharge battery rack, or
    setting all battery racks constituting the ESS as the discharge battery rack.

4. The ESS of claim 3, wherein the discharge order setting module is configured to set an order for sequentially discharging the discharge battery rack.

5. The ESS of claim 2, wherein each switch assembly of the plurality of battery racks comprises:
    a main output control switch having a first end connected to the main output line and a second end connected to an output terminal of the respective battery rack; and
    a forced discharge control switch having a first end connected to the forced discharge line and a second end connected to an output terminal of the respective battery rack,
    wherein in response to a battery rack being set as a forced discharge battery rack, the controller is configured to turn off the respective main output control switch and to turn on the respective forced discharge control switch.

6. The ESS of claim 1, wherein the forced discharge device is configured to consume a predetermined power capacity within a predetermined time.

7. The ESS of claim 1, wherein the fire detector detects a temperature of the respective battery rack and a presence of smoke.

8. The ESS of claim 2, further comprising a vibration detector configured to detect vibration of the ESS,
    wherein when a vibration larger than a predetermined vibration is detected by the vibration detector, the forced discharge battery rack setting module is configured to set all the battery racks constituting the ESS as a discharge battery rack.

9. The ESS of claim 3, wherein the predetermined SOC is approximately a 60% SOC.

10. An energy storage system (ESS) comprising:
    a plurality of battery racks;
    a forced discharge device configured to forcibly discharge power of the ESS;
    a main output line configured to form a current path between the plurality of battery racks and an electronic device;
    a forced discharge line configured to form a current path between the plurality of battery racks and the forced discharge device;
    an ESS controller configured to set a connection of the plurality of battery racks to one of the main output line and the forced discharge line; and
    a vibration detector configured to detect vibration of the ESS,
    wherein each of the plurality of battery racks comprises a switch assembly configured to connect the battery rack to the main output line or the forced discharge line under control of the ESS controller, and
    wherein each switch assembly is directly connected to the forced discharge line, and
    wherein the forced discharge device is configured to discharge at least one battery rack of the plurality of battery racks to a predetermined state of charge (SOC), the predetermined SOC being greater than a 30% SOC.

11. The ESS of claim 10, wherein when a vibration larger than a predetermined vibration is detected by the vibration detector, each of the battery racks is configured to discharge through the forced discharge device.

12. The ESS of claim 11, wherein, if a vibration larger than the predetermined vibration is detected, each of the battery racks is configured to discharge to less than approximately a 60% state of charge (SOC).

13. The ESS of claim 10, wherein the forced discharge device is configured to consume a predetermined power capacity within a predetermined time.

14. The ESS of claim 11, wherein the predetermined SOC is approximately a 60% SOC.

* * * * *